United States Patent [19]

Jarret et al.

[11] Patent Number: 4,611,792

[45] Date of Patent: Sep. 16, 1986

[54] HYDROSTATICALLY COMPRESSED ELASTOMERIC SHOCK ABSORBER SPRING AND METHOD FOR ITS MANUFACTURE

[75] Inventors: Jean Jarret, Paris; Jacques Jarret, Louveciennes, both of France

[73] Assignee: Societe d'Exploitation des Ressorts Auto-Amortisseurs Jarret, Paris, France

[21] Appl. No.: 519,384

[22] Filed: Aug. 1, 1983

[30] Foreign Application Priority Data

Aug. 2, 1982 [FR] France .................. 82 13475

[51] Int. Cl.[4] .................. B28B 7/32; F01B 29/10; F16F 1/36
[52] U.S. Cl. .................. 267/149; 60/528; 264/236; 264/314; 264/573; 267/152
[58] Field of Search .................. 60/528; 248/550, 571; 337/119; 267/24, 31, 36 A, 64.13, 64.27, 64.28, 113, 69, 133, 136, 140.1, 140.2, 140.4, 148, 149, 151, 152, 158, 160, 164, 165, DIG. 1, 63 R; 264/137, 236, 314, 573

[56] References Cited

U.S. PATENT DOCUMENTS 2,767,739 10/1956 Hughes et al. .................. 267/113
2,800,320 7/1957 Jarret et al. .................. 267/63 R
4,057,212 11/1977 Schubert .................. 248/550
4,172,590 10/1979 Jarret et al. .................. 267/152 X

FOREIGN PATENT DOCUMENTS 1032039 6/1958 Fed. Rep. of Germany ...... 267/152
1117413 11/1961 Fed. Rep. of Germany .
1090440 3/1955 France .
1091681 4/1955 France .
1160479 7/1958 France .
1302474 7/1962 France .
1393384 2/1965 France .
2309748 11/1976 France .................. 60/528
2349067 11/1977 France .
57-116610 7/1982 Japan .................. 264/314

Primary Examiner—Bruce H. Stoner, Jr.
Assistant Examiner—Richard R. Diefendorf
Attorney, Agent, or Firm—Staas & Halsey

[57] ABSTRACT

An improved hydrostatically compressed elastomeric spring in which an inner metal core buried in the elastomer contained in a flattened and bent tube constitutes a heating resistor for the elastomer to control its expansion and the compression of the spring under the effects of a static load. The spring is useful in shock absorbing devices.

4 Claims, 2 Drawing Figures

HYDROSTATICALLY COMPRESSED ELASTOMERIC SHOCK ABSORBER SPRING AND METHOD FOR ITS MANUFACTURE

BACKGROUND OF THE INVENTION

The present invention relates to an improved hydrostatically compressed elastomeric shock absorber spring and method for its manufacture.

The production of hydrostatic compression springs, whose casing in the form of a bent flattened tube contains an elastomer under hydrostatic compression, is known.

However, one of the drawbacks of these springs of a bent tube shape (C-shaped or S-shaped) resides in their high flexibility, that is to say their tendency to be squashed particularly under the effect of a given static load. It follows that if the load varies, the squashing varies, which may be unsuitable for certain uses of the spring. This is particularly the case when these springs are employed to suspend an automobile vehicle body with respect to a chassis bearing the wheels.

It is known in addition that, by heating the mass of an elastomer enclosed in a deformable casing, this elastomer is expanded in this casing, which permits the elastic reaction of the so-constituted hydrostatically compressed elastomer spring to be regulated. It is thus possible to adjust the length of the spring and to render it constant whatever the variation in the load that it supports or the temperature variation that it undergoes.

Now, taking into account the shape itself of these springs, i.e., a S-shaped or C-shaped springs having very long lengths in relationship to their cross-sections, a heating of the elastomer must lead rapidly to thermal equilibrium and heating of the casing, which, after experimental observation, gives mediocre results as to the desired effect.

It has been realised, however, that if a metal core buried in the elastomer is used as an electrically resistant element, it was possible to transmit rapidly a flow of heat to the elastomer and to create transversely to the tube, a temperature gradient which, due to considerable thermal inertia and insulating power of the elastomer, remains constant. The desired object is then achieved under much better conditions.

SUMMARY OF THE INVENTION

It is therefore a principal object of the invention to provide an improved hydrostatic compression elastomer shock absorber spring constituted by a casing in the form of a bent deformable elastic tube, of flattened cross-section and filled with elastomer, and comprising a regulating device for the expansion of the elastomer in the casing.

According to one of the principal features of the invention, the heating element of said regulating device is constituted by a core of elastic and electrically resistant material, immersed in the elastomer and connected to an electrical supply circuit provided with a switch whose actuation is controlled by a detector of the length of the spring.

In a preferred embodiment, said spring comprises two metal end-pieces fastened to the core and a fluid-tight deformable envelope, connected in fluid-tight manner to said end-pieces which are provided with means for the selective connection of the inner space of the envelope with a source of filling material.

According to another aspect of the invention, there is provided a method for the manufacture of the above said spring according to which said deformable envelope is intercalated between the core and the outer tube which is constituted by an armature of flexible fibers not yet impregnated with resin, then said envelope is inflated with air through said end-pieces, the inflating pressure is maintained during the impregnation and the baking of the outer tube and finally the above elastomer is injected through one of said end-pieces into the space situated between the core and the envelope at a predetermined pressure.

The invention will be better understood in the course of the description given below by way of an illustrative and non-limiting example, thus enabling the advantages and secondary features to be clarified.

BRIEF DESCRIPTION OF THE DRAWINGS

Reference will be made to the accompanying drawings in which.

DESCRIPTION OF A PREFERRED EMBODIMENT

Figure 1:
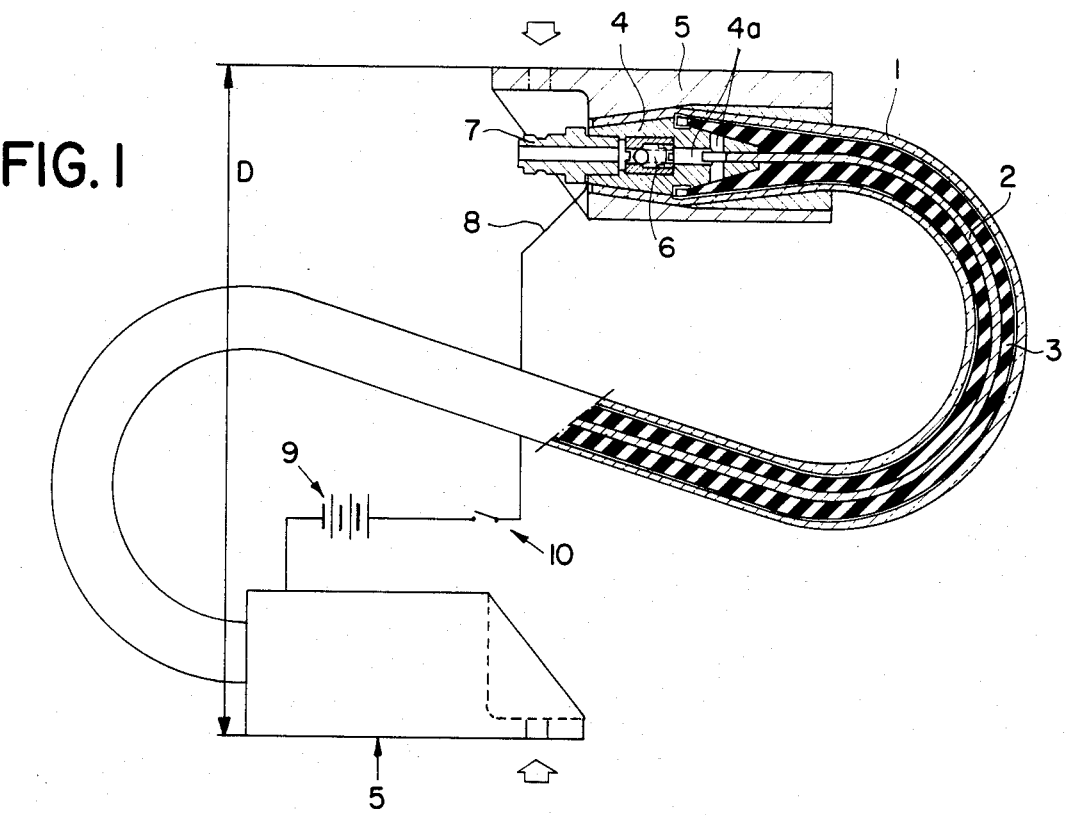
FIG. 1 is a view, partly in cross-section, of an embodiment of a spring according to the invention.

Referring first to FIG. 1, there is seen an S-shaped spring comprising:

an outer casing 1 in the form of a tube of laminated material (epoxy glass, for example) of which the cross-section has a substantially elliptical shape and whose wall thickness represents about one fifth of the small axis of the elliptical cross-section, a metallic core 2 (18/8 stainless steel, for example) of a very flattened cross-section whose thickness is about one tenth of the width, this core being preferably perforated by a large number of cylindrical holes enabling the resistance to the passage of the current to be increased, a compressed elastomeric mass 3 (for example, very high viscosity silicone rubber) occupying the whole of the space available between the metal core and the outer envelope of laminated material, the elastomer being selected for its high co-efficient of thermal expansion which permits an increase in the volume of the elastomer, under constant pressure, of 1/1000 for a rise in temperature of 1° C.

Each end of the tube 1 is provided with an end-piece 4 which cooperates with a plate 5 to close the tube 1 in a sealed manner. Plate 5 serves for its part, as a connecting element of the spring to the mechanism which will apply external forces to the spring. Plate 5 is normally electrically insulated fom the end-piece 4 by the tube 1 itself.

The end-piece is coupled to the core 2 and comprises a series of canals 4a equipped with a retaining mechanism (a ball valve 6) enabling the space comprised between the core 2 and the tube 1 to be filled from the outside by means of a connecting member 7 to a source of filling substance.

The end-piece 4 can also be electrically connected through a lead 8 to a source of electrical current 9 (for example, a battery of accumulators). Thus, the core 2 is positioned as an electrical resistor between the battery 9 and ground (represented by the plate 5 opposite the end-piece 2 connected to the lead 8).

A switch 10 is normally open when the plates 5 are separated by a particular distance D. If this distance diminishes under the effect of the load, switch 10 closes and creates a dissipation of electrical energy in the form of heat in the core 2. This heat-flow causes an expansion of the elastomer 3 which results in a return to the abovesaid separation D of the plates 5 again interrupting the flow of current.

In a spring constructed according to the abovementioned features, it is possible to support elastically a variable static load maintaining the distance constant in the vertical direction, i.e., the distance which separates the two end-pieces of the spring. Consequently, on a vehicle equipped in its suspension by such springs, it will be possible, by means of the direct supply of electrical energy, to ensure a constant distance between the suspended body and the ground whatever the useful load imposed on the vehicle. When an additional static load is applied, the spring is squashed under the gravitational effects of this load, and the approach of the end-pieces of the spring triggers the sending of an electrical current into the core of the spring. Thus, this ensures, as a function of the heat energy supplied, a displacement of the two end-pieces which, generally in some seconds or in some tens of seconds, reestablishes the position of the suspended body with respect to the ground.

Figure 2:
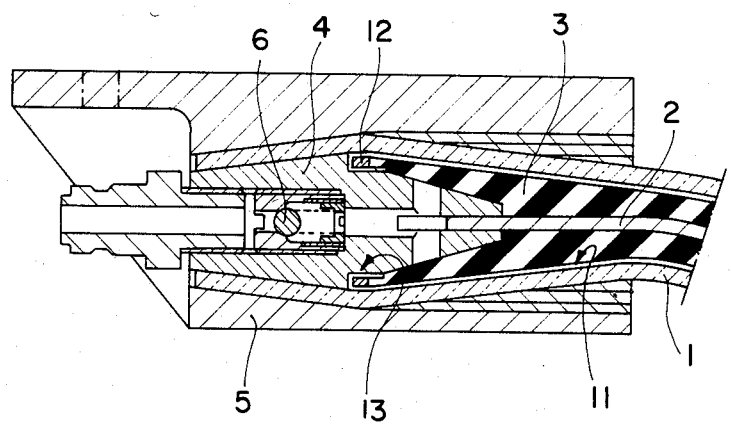
FIG. 2 is a detailed view of one of the ends of the embodiment of the spring of FIG. 1.

In FIG. 2, there is shown in detail one end of the spring according to the invention to illustrate an advantageous manufacturing method for same. Certain of the elements already described bear the same reference numerals. It will be noted that the end-piece 4 is equipped with a jacket 11 of tubular elastic material cleated in a sealed manner to the end-piece 4 by a metallic ring 12 in a groove 13 of the end-piece. The same construction is effected at the other end of the spring. In this way, between the core 2 and the jacket 11 a chamber is defined which can be inflated. The jacket 11 is applied then against the outer tube 1 which is constituted in a known manner by a plurality of tubes of woven fibers intended to be impregnated with thermosetting resin. The canals 4a of the end-piece 4 are placed in communication with a source of compressed gas, while those of the other end-piece are closed either by the valve 6, or by a plug.

This positioning of the jacket 11 is effected at the moment of assembling the constituent of the spring, that is to say before impregnation by the resin. Before and during the impregnation of the fibers of the outer tube, a pressure is established pneumatically and maintained inside the jacket of the spring, so that the fibers of high mechanical strength of the outer tube are placed in a suitable position to withstand the later high pressures of the elastomer. In fact, the fibers of the outer tube before impregnation are generally woven in a fairly loose manner, and their orientation will be finally established under the action of the pneumatic pressure, this orientation being finally effected when the impregnation liquid has become a solid material by polymerization and curing. In this way, the resistance of the jacket to the pressure of the elastomer is increased and the tissue of the fibers do not remain folded at the moment of impregnation, which would have the result of considerably reducing the modulus of elasticity and the elastic limit of the laminated material in the zone where the folding would have remained.

In addition, the maintenance of pressure inside the jacket at the moment of impregnation gives the jacket the most suitable form so that there is established a space available between the core and the jacket in order that the high viscosity rubber can be easily injected through one end and can occupy without difficulty the whole of the capacity of the jacket. Final injection under a pre-determined pressure moreover, enables the assurance of an elastic deformation of the spring corresponding to the production of a pre-stressing of the jacket which will then be capable of greater deformation. This permits an increase in the useful travel of the spring and of the mechanical energy stored in the spring.

The hydrostatic compression elastomeric spring constructed according to the features indicated above and according to the specific method of manufacture described above constitutes in a particular application a vehicle suspension element which enables great reliability in the damping of the relative movements of the wheels and the suspended portion of the vehicle, while preserving for this suspended portion a constant body position, corrected by a contribution of electrical energy which is a function of the useful load carried.

What is claimed is:

1. An improved hydrostatically compressed elastomeric shock absorber spring comprising:
   (a) a casing of variable volume in the form of an elongated, bent deformable elastic tube having a flattened cross-section;
   (b) an elastomer filling the elongated tube;
   (c) regulating means for regulating the expansion of the elastomer in the elongated tube in accordance with the length of the spring, wherein the regulating means includes:
      (i) a source of electric current,
      (ii) an electrical current source switch,
      (iii) means for detecting the length of the spring and controlling the switch, and
      (iv) a heating resistor connected to the electric current source, buried in the elastomer, in the form of a central core along the elongated tube, having a flattened cross-section, and made of a flexible and electrically resistant material; and
   (d) two metal end-pieces fastened to the core for closing respective ends of said tube and for connecting the core to the source of electric current.

2. The spring according to claim 1, further comprising a fastening plate for spring ends mounted on each end-piece and electrical insulation interposed between the respective fastening plates and end-pieces.

3. The spring according to claim 2, wherein the ends of the tube are formed of electrically insulating material, cap the end-pieces and ensure the insulation of the end-pieces.

4. A method for the manufacture of a hydrostatically compressed elastomeric shock absorber spring comprising the steps of:
   (a) providing an outer tube of an armature of flexible fibers;
   (b) providing a center core for the inside of the outer tube, the center core being formed of a flexible and electrically resistant material and having core end-pieces selectively connectable to a fluid source under pressure and an elastomer material source;
   (c) intercalating a deformable, air-inflatable jacket between the core and outer tube, the jacket being sealingly connected to the core end-pieces;
   (d) inflating the jacket with fluid under pressure through one of the end-pieces, the jacket expanding to contact the armature of flexible fibers of the outer tube;

(e) impregnating the armature of the flexible fibers of the outer tube with resin and curing the outer tube while maintaining the inflation of the jacket against the armature of flexible fibers with the fluid under pressure; and (f) injecting an elastomer between the core and jacket through one of the end-pieces.

* * * * *